United States Patent [19]

Sullivan

[11] 4,085,919
[45] Apr. 25, 1978

[54] LENS-CASTING CELL

[75] Inventor: Philip J. Sullivan, Worcester, Mass.

[73] Assignee: American Optical Corporation, Southbridge, Mass.

[21] Appl. No.: 812,925

[22] Filed: Jul. 5, 1977

Related U.S. Application Data

[63] Continuation of Ser. No. 713,933, Aug. 12, 1976, abandoned.

[51] Int. Cl.² .......................... B29C 1/00; B29D 11/00
[52] U.S. Cl. ...................................... 249/134; 249/117; 249/154; 249/163; 425/808
[58] Field of Search .................. 425/808; 249/117, 134

[56] References Cited

U.S. PATENT DOCUMENTS

| | | | |
|---|---|---|---|
| 2,890,486 | 6/1959 | Crandon | 425/808 |
| 3,278,654 | 10/1966 | Geardperret | 425/808 |
| 3,555,611 | 1/1971 | Reiterman | 425/808 |
| 3,902,693 | 9/1975 | Crandon et al. | 425/808 |

Primary Examiner—J. Howard Flint, Jr.
Attorney, Agent, or Firm—Jeremiah J. Duggan; Howard R. Berkenstock, Jr.

[57] ABSTRACT

A cell for casting resinous ophthalmic lenses including an annular gasket of resilient material and a pair of meniscus glass mold halves between which a lens may be cast. The mold halves are loaded into one side of the gasket annulus, one fully entered and seated against an inwardly directed locating flange and the other peripherally snapped into an annular receiving groove spaced away from the flange.

3 Claims, 5 Drawing Figures

LENS-CASTING CELL

This is a continuation of application Ser. No. 713,933 filed Aug. 12, 1976, now abandoned.

BACKGROUND OF THE INVENTION

1. Field of the Invention

Lens-casting apparatus with particular reference to improvements in casting cells of the type comprising a pair of spaced and gasketed glass mold halves.

2. Discussion of the Prior Art

Ophthalmic lens-casting cells are customarily peripherally sealed with T-gaskets, i.e. annular gaskets having a horizontally disposed generally T-shaped cross-sectional configuration. Opposite sides of internal portions of these gaskets provide seats against which, in each case, a glass mold half is clamped to form the lens-casting cavity.

Assembling a casting cell of this type requires access to both sides of the gasket and inversion or other special handling in applying the mold halves, not to mention the added tediousness of having to clamp the molds to the gasket, e.g. with a spring-tempered C-clamp.

In addition to the heretofore tedious and time-consuming assembly of parts which contributed to high end product cost and less than optimum production yield, peripheral sealing of non-spherical (aspheric or toric) mold surfaces against the gasket seats has been problematic. Variations in land or seat thicknesses are required to suit varying height or edge thicknesses of these molds. Different gasket tooling thus being required for spherical and toric lens-casting operations complicates gasket inventory and further contributes to the complexity and undue costliness of present day ophthalmic lens-casting operations.

Adding to the aforesaid problems is the customary need for enlargement of diameters of glass molds substantially beyond maximum diameters required of lenses to be cast. This is dictated by the T-gasket geometry which requires portions of the mold surfaces to make contact with gasket seats. Since difficulties in obtaining a necessary casting accuracy of toric mold surfaces are compounded by increases in mold diameter, especially in strong torics, considerable importance can be placed upon minimizing to the greatest extent possible the diametral sizes of glass-casting molds.

The latter being a special aim of the present invention is accomplished to its fullest as will become apparent hereinafter; and an additional object of the invention is to minimize the number of components necessary in gasketed lens-casting cells, to simplify and accelerate the cell assembly procedure, to enhance the accuracy of the casting surface curvature and, in general, to optimize cast lens product yield and quality with a reduction in casting apparatus cost, parts handling, inventory and overall manufacturing expenditures.

Other objects and advantages of the invention will become more readily apparent hereinafter.

SUMMARY OF THE INVENTION

The foregoing objects and their corollaries are accomplished according to this invention by the provision of a novel lens-casting cell having an annular mold-supporting gasket of generally L-shaped cross-section providing a lower inwardly directed flange against which a first meniscus mold half may be seated by entrance into an opposite open mold loading side of the gasket. The loading side of the gasket is internally chamfered to initially freely receive the mold half entered thereinto, guiding it accurately into place when it is pressed toward the receiving flange.

Above the flange, the wall of the gasket is internally perimetrically grooved to receive the edge of a second meniscus mold half in snap-in fashion for fixing this mold half in a predetermined space relationship with the first mold half to produce a lens-casting cavity therebetween. The wall or edge of the first mold half is at least in part angled inwardly toward the mold half axis to facilitate its insertion into the gasket. This further provides the first mold half with minimum edge thickness adjacent its convex surface for effecting a tight slightly indentured sealing relationship with the gasket wall. The annular groove provides double-line sealing contact with the edge of the second mold half.

Loading of the lens-casting mold halves is accomplished from one side only of the resilient gasket and each mold half is sealed by the gasket material adjacent its extremities. Thus, the diametral size of casting cavity is substantially equal to the mold half diameters so that full utilization of the mold half surfaces may be made during casting. The snap-in feature for receiving the second mold half obviates the heretofore need for mold clamps and clamping operations.

Details of the invention will be more readily understood from the following description when taken in conjunction with the accompanying drawings in which.

DESCRIPTION OF THE PREFERRED EMBODIMENTS

Figure 1:
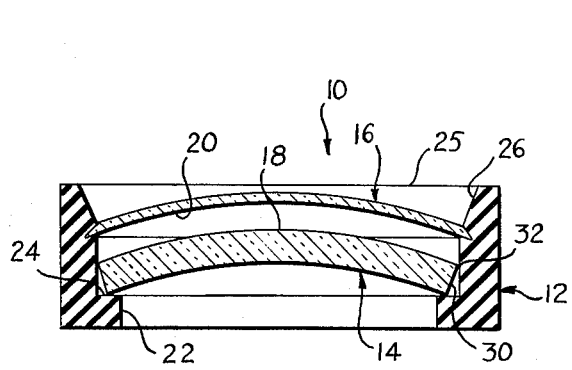
FIG. 1 is an illustration in vertical cross-section of a preferred embodiment of the invention.

Referring more particularly to the drawings, lens-casting cell 10 (FIGS. 1–4) comprises resilient gasket 12 and meniscus mold halves 14 and 16. Mold half 14 has convex casting surface 18 which is used to form the negative or concave side of a lens to be cast in cell 10 and mold half 16 has concave casting surface 20 which is used to form the convex side of a lens or lens blank cast in cell 10.

Gasket 12 is formed of a durable shape-retaining but resilient material such as, for example, a polyvinyl resin having an ultimate tensile strength of in the order of 1600 psi and ultimate elongation of aproximately 350 percent. A compound known to the trade as Geon Plastic 8847 manufactured and sold by Goodrich Chemical Co. of Cleveland, Ohio, U.S.A., is exemplary. Other suitable materials are set forth in U.S. Pat. Nos. 2,542,386; 3,056,166; 3,136,000 and 3,881,683. Gasket 12 is preferably mounted to the shape desired using a molding mixture of virgin material alone or combined with a regrind of previously cast material.

Mold halves 14 and 16 are formed of glass such as optical crown having their sides 18 and 20 ground and polished to a finish at least corresponding to that desired of cast lens surfaces to be produced thereby in cell 10.

Figure 2:
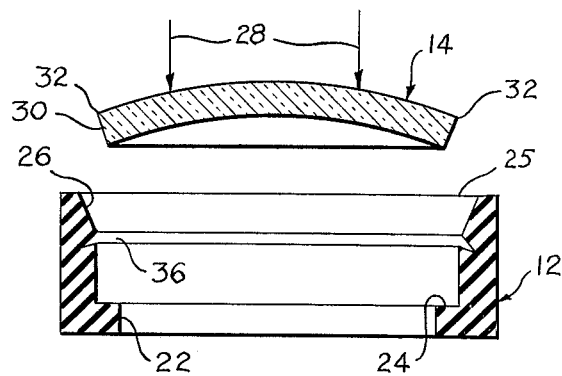
FIGS. 2 and 3 are similarly cross-sectioned illustrations of elements of the embodiment of the invention shown in FIG. 1 and wherewith a preferred technique for assembling the lens-casting cell of FIG. 1 is diagrammatically illustrated.
Figure 3:
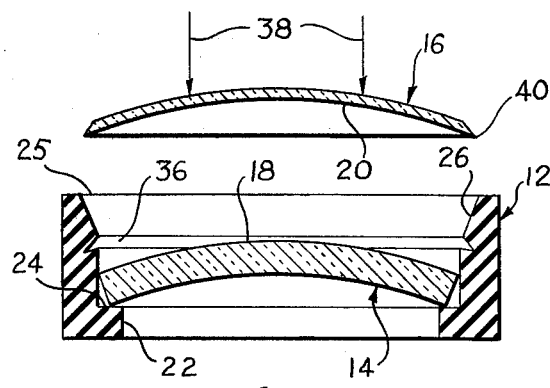

Gasket 12, when viewed as depicted in FIGS. 1–4, is provided with a lower inwardly directed annular flange 22 having surface 24 which provides a seat for receiving and locating mold half 14 in a desired position of use. The opposite upper mold loading side 25 of gasket 12 is provided with a chamfer 26 which is adapted to initially freely receive either of mold halves 14 and 16, guiding the same into place when they are pressed into gasket 12. For example, as illustrated in FIG. 2, the loading of gasket 12 with mold half 14 is accomplished by entering this mold half into chamfer 26 in the direction of arrows 28 and forcing it fully into gasket 12 against flange 22 as illustrated in FIG. 3. The edge 30 of mold half 14 is so angled as to present a minimum of thickness to internal walls of gasket 12. The diameter of mold half 14 across side 18 is slightly larger than that of wall 34 of gasket 12 whereby the uppermost portion 32 of edge 30 becomes slightly indented into wall 34 when mold half 14 is fully inserted against flange 22. This affords a tight seal about mold half 14 and anchors the mold half against accidental displacement.

Disposed above flange 22 is groove 36 into which mold half 16 may be peripherally intimately fitted, in snap-in fashion, when pressed through chamfer 26 in the direction of arrows 38 (FIG. 3). The location of groove 36 above surface 24 of flange 22 is established according to the thickness desired of a lens to be cast between mold halves 14 and 16 of FIGS. 1 and 4.

The "snap-in" feature of securing mold half 16 in place affords double line top and bottom contact of gasket material with the edge of mold half 16 thereby sealing the mold half in place.

With mold half 14 fixed against displacement by slight indenturing portion 32 of its edge 30 in the material of gasket 12 and the edge 40 of mold half 16 snapped into groove 36, the need for prior art mold clamps and clamping operations is obviated. Furthermore and importantly, utilization of substantially the full diametral dimensions of mold surfaces 18 and 20 for casting is made possible.

Figure 4:
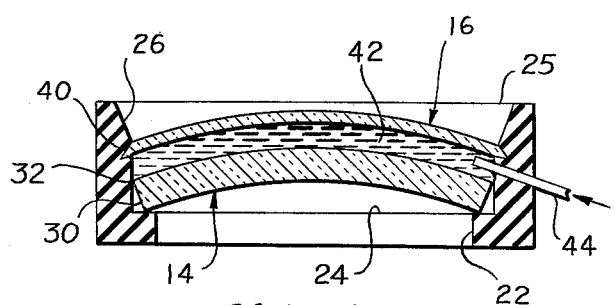
FIG. 4 is another cross-sectional illustration of the embodiment of FIG. 1 wherein a technique for filling the casting cell with a liquid casting resin is illustrated.

Lens casting in the sealed cavity 41 between mold halves 14 and 16 may be accomplished by injection of a casting medium 42 into the cavity e.g. as shown in FIG. 4 wherein hollow needle 43 is used to dispense the casting medium. It should be understood, however, that in place of the slot 44 in gasket 12 which facilitates entrance of hollow needle 44 beneath mold half 16, other grooves, perforations and/or dispensing apparatuses may be employed to satisfy particular situations.

The lens-casting medium may comprise any well-known resin of optical quality, e.g. allyldiglycol carbonate. After filling cell 10 with a casting resin (FIG. 4) it is subjected to a resin curing cycle usually employing the application of heat. Those interested in details of resin casting and curing may refer to one or more of the great multiplicity of patents issued on the subject. U.S. Pat. Nos. 2,542,386; 3,056,166; 3,136,000; and 3,881,683 are exemplary. The present invention being directed more particularly to the above-described unique lens-casting cell construction has utility in lens-casting operations employing any and all casting resins and curing cycles common to the trade.

Figure 5:
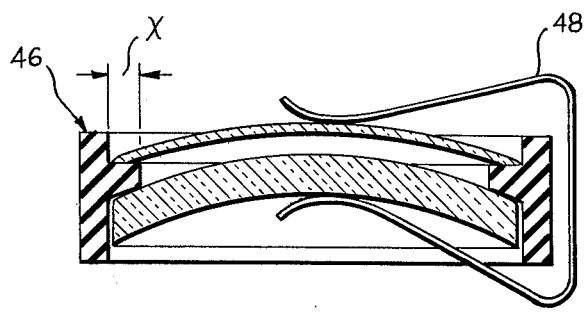
FIG. 5 is a view, in cross-section, of a prior art lens-castIng cell wherewith details of the improvement of the present invention can be more easily understood.

FIG. 5 illustrates a typical prior art lens-casting cell utilizing the customary T-gasket 46 and clamp 48, the latter being obviated by the present invention. Additionally and importantly, the loss of casting mold surface area completely peripherally about each casting mold, i.e. the area equal to width x of the internal mold seat of T-gasket 46 is further obviated according to the present invention. As pointed out hereinabove, substantially the full surface diameters of applicant's lens-casting molds are utilized as casting surfaces.

Those skilled in the art will readily appreciate that there are various modifications and adaptations of the precise forms of the invention here shown which may suit particular requirements and that the foregoing illustrations are not to be interpreted as restrictive of the invention beyond that necessitated by the following claims.

I claim:

1. A lens-casting cell comprising:

an annular gasket of resilient material having an inwardly directed flange adjacent a first of its sides, an internally disposed perimetrical groove adjacent its second side and an inner uniformly diametrally dimensioned wall extending between said flange and groove, there being in internal chamfer adjacent said second side of said gasket and extending inwardly and toward said groove to facilitate entrance of said first and second mold halves through said second side of said cell, said cell requiring single side loading of said mold halves a first meniscus mold half of circular configuration seated against said flange internally of said gasket, said mold half being of an outer diametral dimension greater than that of said wall of said gasket for indenturing said gasket wall and providing a fluid tight seal between said first mold half and gasket;

a second meniscus mold half of circular configuration having a diametral dimension greater than said diametral dimension of said gasket wall, said second mold half being peripherally engaged in said groove; and said first and second meniscus mold halves each having concave and convex opposite sides, a convex side of one of said mold halves and a concave side of the other of mold half being disposed in spaced facing relationship to form a lens casting cavity therebetween.

2. A lens-casting cell according to claim 1 wherein said mold halves are formed of glass and said facing sides thereof are each optically finished according to surface texture desired of lenses to be cast therebetween.

3. A gasket for supporting a pair of meniscus lens-casting molds comprising:

an annulus of resilient material including an inwardly directed mold supporting flange adjacent a first of its sides, an internally disposed perimetrical mold supporting groove adjacent an opposite second side of said annulus and an inner uniformly diametrically dimensioned wall extending between said flange and groove, there further being an internal chamfer adjacent said second side of said gasket, said chamfer extending inwardly and toward said groove for facilitating entrance of casting molds into said gasket.

* * * * *